United States Patent [19]

Nakajima et al.

[11] 4,133,330
[45] Jan. 9, 1979

[54] MULTI-POINT SPARK IGNITION ENGINE PROVIDED WITH EXHAUST RECIRCULATION CIRCUIT

[75] Inventors: Yasuo Nakajima, Yokosuka; Yoshimasa Hayashi, Yokohama; Tooru Yoshimura, Yokosuka, all of Japan

[73] Assignee: Nissan Motor Company, Ltd., Japan

[21] Appl. No.: 776,486

[22] Filed: Mar. 10, 1977

[30] Foreign Application Priority Data

Mar. 11, 1976 [JP] Japan .................................. 51-26316

[51] Int. Cl.² ................................................ F02P 1/00
[52] U.S. Cl. ............................. 123/148 C; 123/119 A; 123/148 DS
[58] Field of Search ...................... 123/148 C, 119 A; 60/323

[56] References Cited

PUBLICATIONS

"Basic Cams, Valves, & Exhaust Systems," Peterson Publications, p. 129, Jul. 1972.

"Multiple Spark Plugs May Mean More Power", U.S. Army, McCook Field, date uncertain.

*Primary Examiner*—Ronald B. Cox

[57] ABSTRACT

An internal combustion engine of the reciprocating piston type, which is provided with an exhaust gas recirculation circuit to suppress the formation of NOx and has two or three spark plugs for each combustion chamber. There is a substantial overlap of the opening periods of exhaust and intake valves, so that a portion of the combustion gas is left unexhausted. The combustion chamber has a simple shape such as hemisphere, and the spark gaps of the plural spark plugs are arranged distant from each other in each combustion chamber so as to respectively share approximately equally divided portions of each combustion chamber. The number of the spark plugs is two when the volume of the recirculated exhaust gas, including the unexhausted combustion gas, is about 50% at the maximum of the volume of air admitted into the combustion chamber but three when the recirculated exhaust gas amounts to about 60% of the air at the maximum.

12 Claims, 19 Drawing Figures

MULTI-POINT SPARK IGNITION ENGINE PROVIDED WITH EXHAUST RECIRCULATION CIRCUIT

BACKGROUND OF THE INVENTION

This invention relates to an internal combustion engine system including an exhaust gas recirculation circuit, wherein each combustion chamber of the engine is provided with a plurality of spark plugs.

In the attempt of minimizing the contribution to the air pollution of exhaust gas of internal combustion engines, particularly automotive engines, it is not easy to satisfactorily lower the concentration of nitrogen oxides (NOx) in the exhaust gas. Conventional methods of minimizing the emission of NOx are classified roughly into two groups: one group intends catalytic reduction of NOx within engine exhaust systems, and the other group consists of various methods for the suppression of the formation of NOx in engine combustion chambers by repressing the maximum combustion temperature, more particularly, by retarding the ignition timing, operating the engine with a lean air-fuel mixture or recirculating a portion of exhaust gas into the combustion chambers.

The use of reduction catalysts leads to a noticeable increase in engine system manufacturing costs and accompanies the need of replacing the catalysts at certain intervals. The second group methods are estimated to be more economical than the catalytic reduction methods and considered to principally be advantageous. However, the repression of the maximum combustion temperature tends to result in incompleteness or instability of the combustion. In other words, the formation of NOx is suppressed by the second group methods usually with the sacrifice of fuel economy (specific fuel consumption) and/or output characteristic of the engines. The prevention of NOx emission, indeed, must be accomplished. However, also it is important to maintain or even improve the high-level performance, including fuel economy, of automotive internal combustion engines hitherto developed. A proper balance should be maintained between the suppression of the formation of NOx and the engine performance.

Among the aforementioned methods for the suppression of the formation of NOx, the recirculation of a portion of exhaust gas to the combustion chambers has the advantage that the fuel economy and output characteristic are not significantly sacrificed in this method so long as the quantity of the recirculated exhaust gas is appropriate. However, it has been recognized that the combustion in the engine becomes unstable, causing a significant degradation of the engine performance, if the exhaust gas recirculation rate (defined as the volumetric ratio of the recirculated exhaust gas to air drawn into the combustion chambers) exceeds a certain level. It is practically impossible to raise the exhaust gas recirculation rate above about 10% for conventional engines. On the other hand, the suppression of the formation of NOx does not reach maximal at the exhaust recirculation rate of 10%. The formation of NOx can more strongly be suppressed by greatly raising the recirculation rate beyond 10%.

Recently attention has been paid by researchers of Nissan Motor Co., Ltd. to the fact that the formation of NOx can be suppressed to a fully satisfactory extent practically without the sacrifice of fuel economy or output characteristic of the engine with the maintenance of a stable engine operation when the exhaust gas recirculation is accomplished at considerably high recirculation rates only if the combustion at each engine cycle is completed in an appropriately shortened period of time. A new engine system recently proposed on the basis of this fact is characterized by the employment of an exhaust recirculation rate far greater than 10% (when maximized: the recirculation rate is controlled according to the operational condition of the engine) and the provision of two or more spark plugs for each combustion chamber of the engine. The plural spark plugs in this engine are arranged so as to individually share approximately equally divided volumes of each combustion chamber and actuated substantially simultaneously. Accordingly flame propagation in each combustion chamber starts at two or more distant ignition points and is completed with a greatly shortened propagation distance. As a result, a greatly diluted air-fuel mixture can stably and completely be burned with a relatively low maximum of the combustion temperature.

The provision of two spark plugs for a single combustion chamber per se is an old technique for improving the reliability of the ignition but has been considered disadvantageous for the suppression of NOx formation because of contributing to a rise in the maximum combustion temperature. The above referred new engine system is unique in that a plurality of spark plugs are provided for each combustion chamber when a great drop of the combustion temperature is intended by recirculating the exhaust gas in large quantities. This engine system fundamentally attained a success in balancing the prevention of the NOx emission with the maintenance of a good engine performance by rapidly completing a low temperature combustion.

However, this new engine system will not attain a practical success unless various factors such as the number and arrangement of the spark plugs, the exhaust recirculation rate and the configuration of the combustion chambers are particularly determined in correlation with each other.

SUMMARY OF THE INVENTION

It is an object of the present invention to improve on the above described type of internal combustion engine system both in the ability of supressing the formation of NOx and in the performance of the engine.

It is another object of the invention to provide an internal combustion engine system including an exhaust gas recirculation circuit capable of accomplishing the recirculation at a rate high enough to greatly suppress the formation of NOx, wherein each combustion chamber of the engine is provided with at least two spark plugs in a number best suited to the maximum value of the exhaust recirculation rate for the engine.

It is a still another object of the invention to provide an engine system particularly for automotive use which includes an internal combustion engine of the reciprocating piston type having two or three spark plugs for each combustion chamber and an exhaust gas recirculation circuit, wherein both the exhaust recirculation rate and the overlap of the opening periods of exhaust and intake valves for each combustion chamber are settled so as to dilute an air-fuel mixture admitted into each combustion chamber with an appropriate amount of a mixture of the recirculated exhaust gas and the unexhausted portion of the combustion gas thereby to best balance the suppression of the formation of NOx with the maintenance of the engine performance, and the spark plugs for each combustion chamber are in a number and in an arrangement best suited to a stable and rapid combustion of the diluted air-fuel mixture.

According to the invention, an engine system comprises: an internal combustion engine of the reciprocating piston type having an intake valve and an exhaust valve for each combustion chamber thereof; an air-fuel proportioning device to supply a combustible mixture of air and a hydrocarbon fuel to the engine; an exhaust recirculation circuit to recirculate a portion of the exhaust gas from the exhaust line of the engine to each combustion chamber together with the combustible mixture at a controlled volumetric flow rate relative to the volume of air admitted into each combustion chamber; and at least two spark plugs for each combustion chamber. The intake and exhaust valves are constructed and arranged such that there is a substantial overlap of the opening periods of the exhaust valve and the intake valve, so that a substantial portion of the combustion gas is left unexhausted from each combustion chamber. The combustion chamber is defined between the top face of the piston and the bottom face of a cylinder head by a surface of revolution on the longitudinal axis of the cylinder bore. The number of the spark plugs for each combustion chamber is determined on the basis of a total volume of the recirculated exhaust gas and the unexhausted combustion gas relative to the volume of air supplied to each combustion chamber, which number is two when the aforementioned total volume is about 50% of the volume of the air at the maximum but three when the total volume is about 60% of the volume of a air at the maximum. The spark gaps of the plural spark plugs are arranged distant from each other in each combustion chamber such that, when the entire area of each combustion chamber in plan view is divided into a plurality of sectors (or hemispheres) which are in the same number as the plural spark plugs and of approximately the same area, each of the sectors contains one of the spark gaps.

The combustion chamber is preferably of the hemispherical type, pancake type, bath-tub type or Heron type.

Each of the spark gaps in each combustion chamber is positioned in a middle region of the aforementioned sectors. Preferably, the spark gaps are all positioned, in plan view of each combustion chamber, in an annular area defined between two concentric circumferences with the cylinder bore axis as their center, the diameters of which circumferences are 40% and 60% of the diameter of the cylinder bore, respectively.

The overlap of the exhaust valve and the intake valve is preferably in the range from about 20 to about 60 degrees in terms of the crank angle.

The air-fuel proportioning device is adjusted such that the air-fuel ratio realized in each combustion chamber is in the range from 13 to 16.5 on the average when the fuel is gasoline.

DESCRIPTION OF PREFERRED EMBODIMENTS

Figure 1:
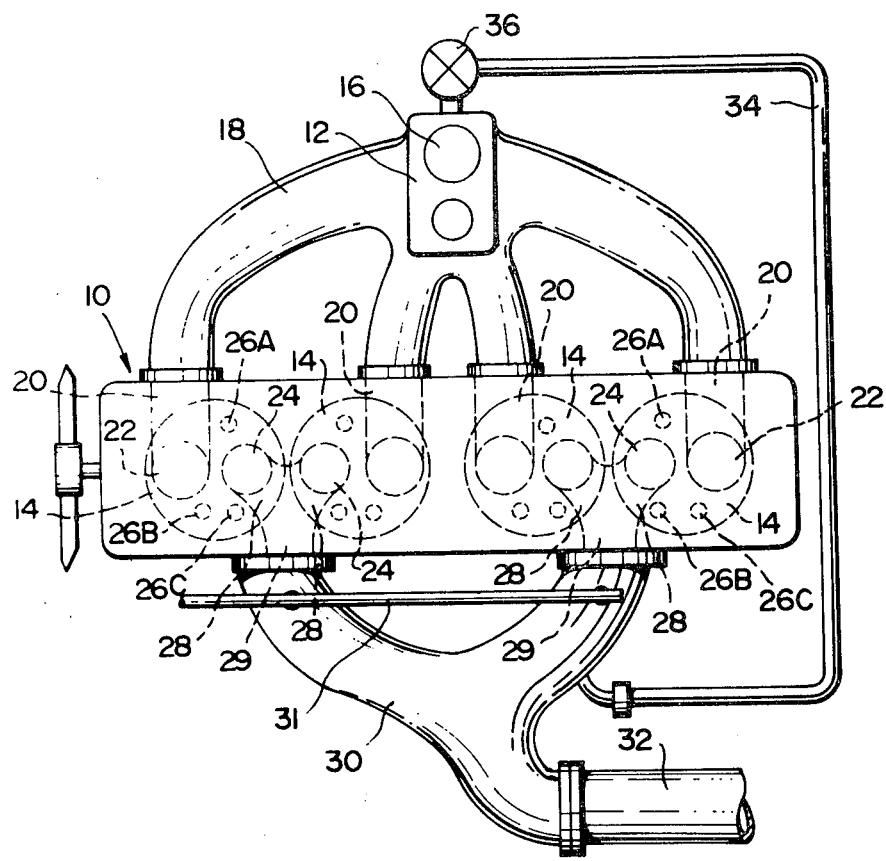
FIG. 1 is a schematic plan view of an engine system according to the invention.
Figure 2:
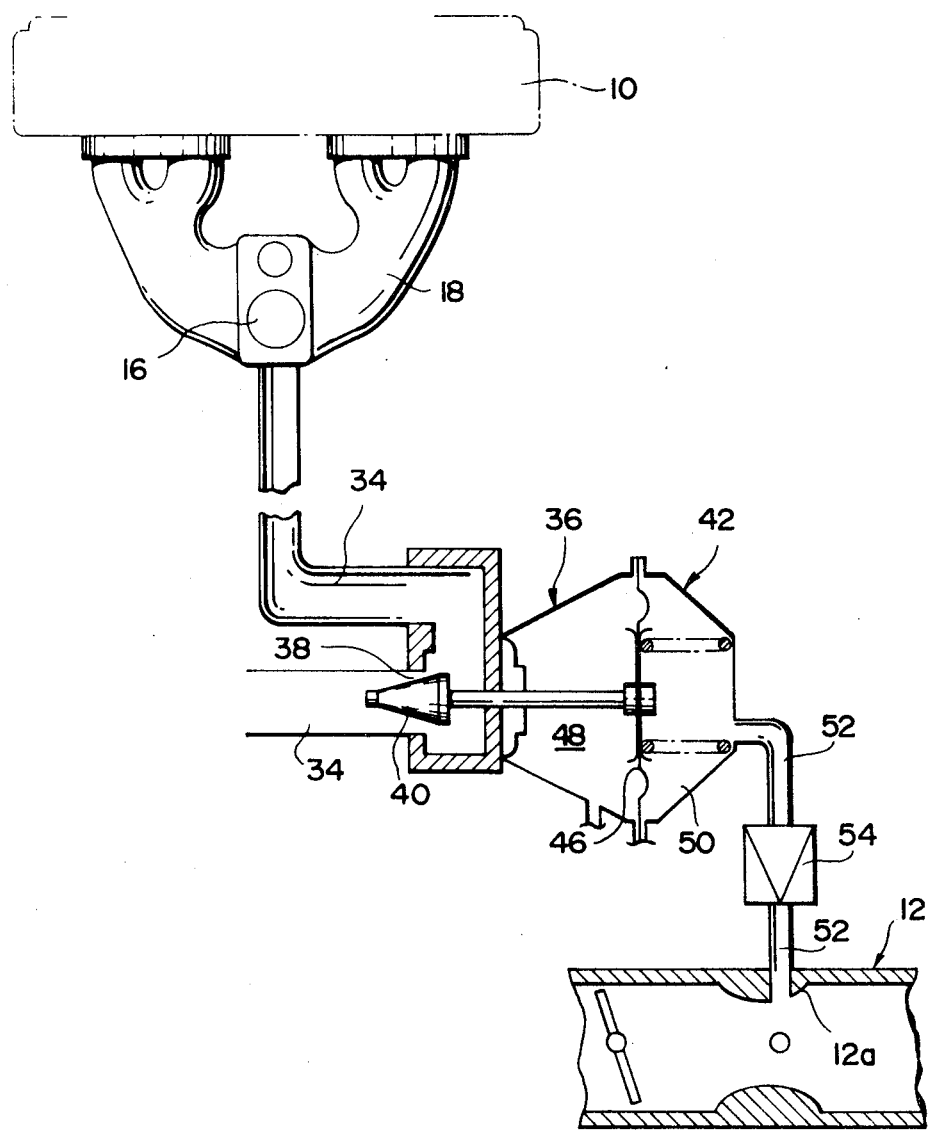
FIG. 2 is a schematic presentation, partly in section, of an exhaust gas recirculation circuit in the system of FIG. 1.
Figure 3:
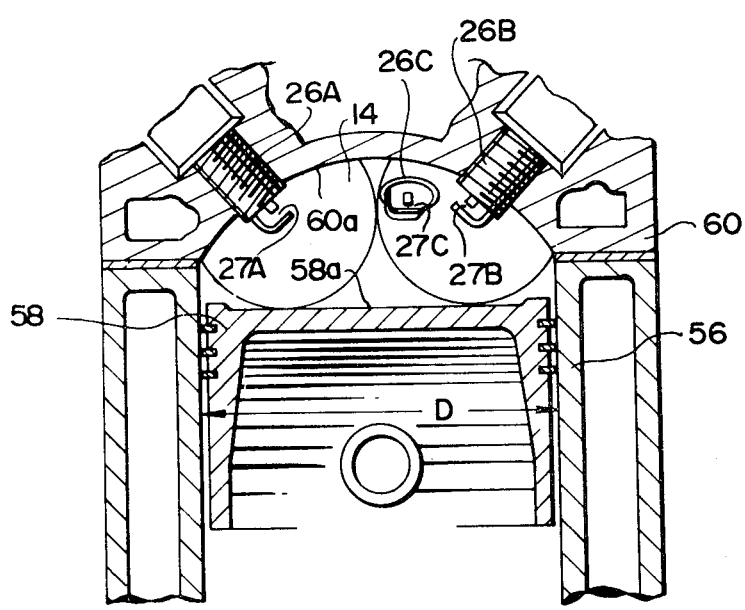
FIG. 3 is a longitudinal sectional view showing a combustion chamber of the engine in the system of FIG. 1.

Referring to FIGS. 1-3, a four-cylinder internal combustion engine 10 is equipped with a carburetor 12 to supply an air-fuel mixture to the respective engine cylinders, i.e., combustion chambers indicated at 14, through an induction passage 16, an intake manifold 18 and intake ports 20. An intake valve 22 and an exhaust valve 24 are provided for each combustion chamber 14 in a usual manner. Three spark plugs 26A, 26B and 26C are provided for each combustion chamber 14 at some intervals between each other as will be described hereinafter. An ignition circuit (not shown) is constructed so as to actuate these three spark plugs 26A, 26B, 26C substantially simultaneously. The exhaust line of this engine 10 includes exhaust ports 28, a thermal reactor 30 which serves also as an exhaust manifold and an exhaust pipe 32. An exhaust gas recirculation passage 34 interconnects the thermal reactor 30 to either the intake manifold 18 or the induction passage 16 at a section downstream from the carburetor 12 in order to recirculate a portion of the exhaust gas into the combustion chambers 14. A flow control valve assembly 36 is arranged to control the volume of the recirculated exhaust gas relative to the volume of air drawn into the combustion chambers 14 by varying the effective cross-sectional area of the recirculation passage 34 according to the operational condition of the engine 10.

An exemplary construction of the recirculation control valve assembly 36 is shown in FIG. 2. The recirculation passage 34 has a metering orifice 38, and a generally conical valve member 40 is axially movably disposed in the passage 34 to vary the effective cross-sectional area of the metering orifice 38. A valve actuator 42 for this valve member 40 has a housing 44 and flexible diaphragm 46 which divides the interior of the housing 44 into two chambers and supports the valve member 40. One (indicated at 48) of these two chambers communicates with the atmosphere and the other (50) serves as a vacuum chamber. For example, a vacuum passage 52 connects the vacuum chamber 50 to venturi section 12a of the carburetor 12, and a vacuum amplifier 54 occupies an intermediate section of the passage 52. The venturi vacuum in the carburetor 12, the magnitude of which is proportional to the quantity of air drawn into the engine 10, is transmitted to the vacuum amplifier 54, and an amplified vacuum signal is transmitted to the vacuum chamber 50. The diaphragm 46 and hence the valve member 40 take various positions depending on the magnitude of vacuum in the chamber 50, so that the quantity of the recirculated exhaust gas varies in proportion to the quantity of air drawn into the engine 10. The vacuum amplifier 54, which may be a diaphragm device, is well known and will need no explanation of its particular details.

Each engine cylinder (indicated at 56 in FIG. 3) of the engine 10 receives therein a reciprocating piston 58 in a usual manner. Each combustion chamber 14 is defined between the top face 58a and a shaped bottom face 60a of a cylinder head 60. The combustion chambers 14 in this example are of the hemispherical type. However, the combustion chambers 14 may differently be shaped so long as the shape is simple. It is preferable that the shape of the combustion chamber 14 is symmetrical with respect to the longitudinal axis 57 of the cylinder bore and that the combustion chamber 14 is defined by a surface of revolution about the axis 57 (of course the combustion chamber 14 may exhibit some deformation needed to the installation of the spark plugs 26A, 26B, 26C and the valves 22, 24). Furthermore, the combustion chamber 14 is preferably included entirely in an imaginary and axial extension of the cylinder bore.

The intake and exhaust valves 22 and 24 are poppet valves of usual design and operated by a usual valve train (not shown). In this engine 10, the overlap of the respective opening periods of the exhaust valve 24 and the intake valve 22 for each combustion chamber 14 at an end portion of an exhaust stroke and an initial portion of a successive intake stroke is considerably greater than the overlap in conventional engines of the similar type: the overlap is settled in the range from about 20° to about 60° in terms of the crank angle. The valve timing overlap is increased so that a considerable amount of the combustion gas may remain unexhausted and mix with the newly admitted air-fuel mixture together with the exhaust gas recirculated through the passage 34. Since the unexhausted combustion gas and the recirculated exhaust gas serve the same function, the total volume of the unexhausted combustion gas and the recirculated exhaust gas is taken in considering the exhaust recirculation rate (relative to the volume of the admitted air) in the description hereinafter. To leave a desirably large portion of the combustion gas unexhausted, it is preferable that the diameter $D_i$ of the head of the intake valve 22 is 47 ± 5% of the diameter D of the cylinder bore, and the diameter $D_e$ of the head of the exhaust valve 24 is 45 ± 5% of D when the aforementioned valve timing overlap is employed.

The quantity of the unexhausted combustion gas upon completion of an exhaust stroke during idling of the engine 10 amounts to, for example, 30–40% by volume of the newly admitted air when the intake and exhaust valves 22 and 24 are designed and operated as described above. Accordingly, a desirable exhaust recirculation rate is realized during idling of this engine 10 without accomplishing the recirculation through the passage 34 (the control valve 36 takes a completely closed position). The intentional retention of a substantial amount of the combustion gas is usually referred to as internal exhaust recirculation.

Figure 4:
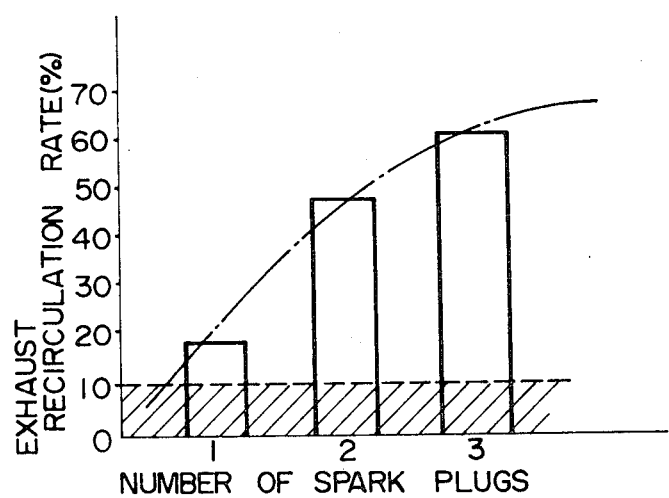
FIG. 4 is a chart showing the relationship between the upper boundary of a permissible range of the exhaust recirculation rate for the engine in FIG. 1 and the number of the spark plugs for each combustion chamber of the engine.

The number of the spark plugs for each combustion chamber 14 is not necessarily three as in FIG. 1 but sometimes is two. It is a primary feature of the invention that the number of the spark plugs for each combustion chamber 14 is particularly determined in dependence on the maximum value of an employed exhaust recirculation rate. The number of the spark plugs is increased as the exhaust recirculation rate is raised. FIG. 4 summarizes the results of our experiments. When the combustion chamber 14 is provided with only one spark plug as in conventional engines, the exhaust recirculation rate (in the above defined sense) cannot be made more than about 20% without causing an unstable combustion. When two spark plugs are provided, the exhaust recirculation rate can be made up to about 50% without causing any instability of the combustion. The provision of three spark plugs allows the employment of the exhaust recirculation rates of up to 60%. The exhaust recirculation rate can further be increased by using four spark plugs, but such a high recirculaion rate is unnecessary and the installation of four spark plugs to each combustion chamber 14 will be unpractical. The described values (20%, 50% and 60%) of the exhaust recirculation rate should be taken as upper limit values for maintaining a stable combustion. For example, instability of the combustion does not occur at any exhaust recirculation rate between 0 and about 60% when each combustion chamber 14 is provided with three spark plugs. The use of two spark plugs suffices to the prevention of an unstable combustion if the exhaust recirculation rate does not exceed about 50% even when maximized. The maximum value of the exhaust recirculation rate is set according to a desired or required level of NOx emission from the engine: the more the exhaust gas is recirculated, the more the formation of NOx is suppressed.

Figure 5:
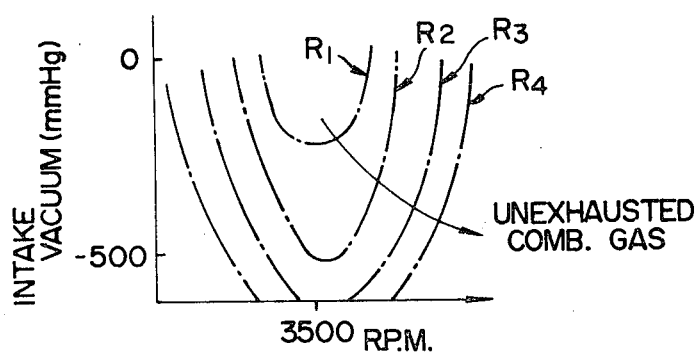
FIG. 5 is a graph showing a variation in the quantity of unexhausted combustion gas as the function of the engine speed and the intake vacuum.

In FIG. 4, the hatched area indicates the share of the internal exhaust recirculation (unexhausted combustion gas) for a four-cylinder 2000 ml engine operated at 2000 r.p.m. with a compression ratio of 8.5. The share of the internal exhaust recirculation varies depending on the operational condition of the engine. In general, the amount of the unexhausted combustion gas becomes minimal in an operational condition range where maximum torque is generated and increases as the operational condition shifts towards the minimum load condition. The contours $R_1$–$R_4$ of FIG. 5 represent this tendency of the amount of the unexhausted combustion gas (the amount increases as the subscript figure increases). The amount of the unexhausted combustion gas depends also on the engine speed and becomes maximal in a medium speed range as seen in FIG. 5. The control of the exhaust gas recirculation through the recirculation passage 34 should be accomplished taking into consideration the variation in the amount of the unexhausted combustion gas.

The arrangement of the plural spark plugs for each combustion chamber is a very important matter in the engine system according to the invention. Ideally, combustion initiated at the spark gaps (indicated at 27A, 27B, 27C in FIG. 3) should be completed in the entire volume of the combustion chamber 14 upon meeting of plural flame fronts propagated from the respective spark gaps. Actually, such a manner of flame propagation cannot be realized whatever arrangement of the spark gaps may be employed since each flame front is a generally spherical surface.

However, it was experimentally confirmed that the engine runs with good stability, fuel economy and output characteristic, even though a high exhaust recirculation rate is employed, if combustion is completed in about 80% or more of the total volume of each combustion chamber at the moment when the piston at each power stroke reaches a position expressed by a crank angle of about 40° (about 15% of the stroke) after the top dead center. Such proceeding of the combustion can be realized by arranging the plural spark gaps in the following manner.

Figure 6:
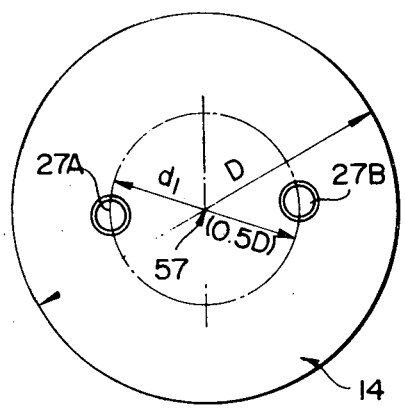
FIGS. 6 and 7 are explanatory and cross-sectional views of two combustion chambers which are respectively provided with ideally arranged two spark plugs and three spark plugs.

In the case of providing two spark plugs 26A, 26B to each combustion chamber 14, one spark gap 27A or 27B must be located in either half part divided by a plane containing the axis 57 of the cylinder bore. Referring to FIG. 6, it is preferable that the two spark gaps 27A, 27B are positioned, in plan view of the combustion chamber 14, on a circumference of a diameter $d_1$ which equals 0.5D with the bore axis 57 as its center to have an angular distance of 180° therebetween. In other words, the two spark gaps 27A, 27B are arranged at a distance of 0.5D and symmetrically with respect to the bore axis 57.

Figure 7:
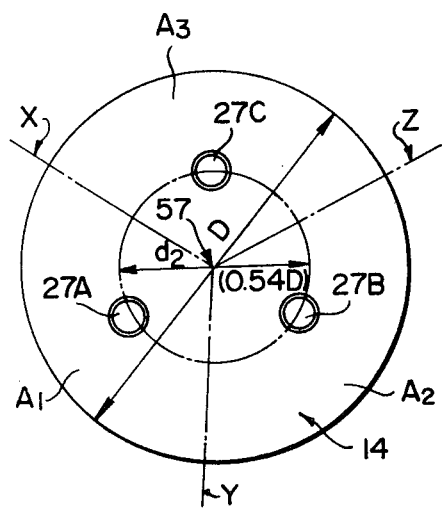

FIG. 7 shows an ideal arrangement of three spark gaps 27A, 27B, 27C in the hemispherical combustion chamber 14. In this case the combustion chamber 14 is imaginarily divided, in plan view into three equal areas $A_1$, $A_2$ and $A_3$ by three planes X, Y and Z which are at 120° from each other and intersect on the bore axis 57. The three spark gaps 27A, 27B, 27C are arranged such that each of these three equal areas or sectors $A_1$, $A_2$, $A_3$ contain one spark gap 27A, 27B or 27C in its middle region. More particularly, the three spark gaps 27A, 27B, 27C are on a circumference with the bore axis 57 as its center to divide this circumference into three equal parts. The diameter $d_2$ of this circumference equals 0.54D.

Figure 8:
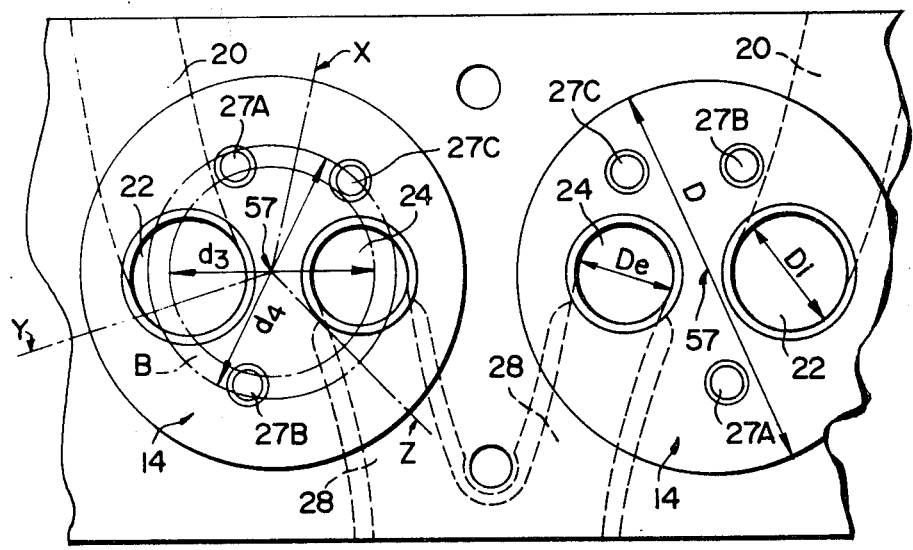
FIG. 8 is a schematic and cross-sectional view of a combustion chamber in an engine system according to the invention, showing the arrangement of three spark plugs for the combustion chamber.

In practice, the two spark gaps 27A, 27B can be arranged substantially as shown in FIG. 6 without being interfered with the intake and exhaust valves 22 and 24 (these valves are omitted from FIGS. 6–7 for simplification). However, the arrangement of the three spark gaps 27A, 27B, 27C shown in FIG. 7 is hardly realizable in practice because of the presence of the intake and exhaust valves 22 and 24. Accordingly, it is preferable to slightly modify the arrangement of FIG. 7 as shown in FIG. 8. The combustion chamber 14 in plan view is divided into three equal (or approximately equal) areas $A_1$, $A_2$, $A_3$ by the three planes X, Y, Z in this case too, and the three spark gaps 27A, 27B, 27C are allotted respectively to these three areas $A_1$, $A_2$, $A_3$. The three spark gaps 27A, 27B, 27C are preferably located in an annular area (indicated at B in FIG. 8) defined in plan view of the combustion chamber 14 by a circumference $C_1$ having a diameter $d_3$ of about 0.4D with the bore axis 57 as its center and another circumference $C_2$ which is concentrical with the former circumference $C_1$ and has a diameter $d_4$ of about 0.6D. Furthermore, each of the spark gaps 27A, 27B, 27C is positioned as near as possible to the middle of the allotted area $A_1$, $A_2$ or $A_3$ so that the circumferential distances from the other two spark gaps may become as long as possible.

The merit of the provision of the plural spark plugs for each combustion chamber is obtained only when the spark plugs, or their spark gaps, are carefully arranged as described above. Practically no merit will be obtained if the plural spark gaps gather in a cluster. On the other hand, a desirably rapid completion of the combustion will not be accomplished if the plural spark gaps in plan view of the combustion chamber are unduly greatly distant from each other.

Figure 9:
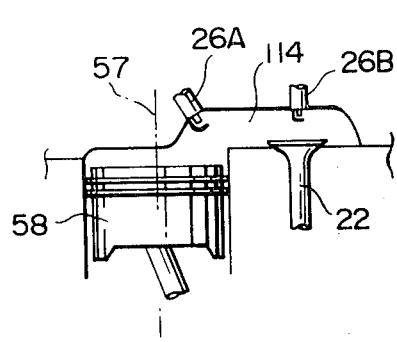
FIGS. 9 and 10 are schematic and sectional views of a L-head type combustion chamber and a wedge type combustion chamber, respectively, for the explanation of two-point ignition in these combustion chambers.
Figure 10:
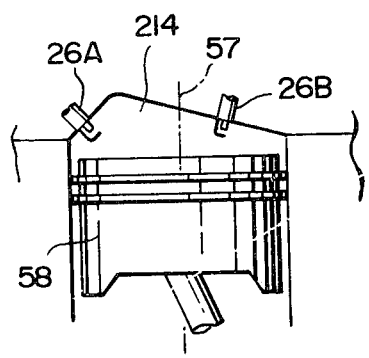
Figure 11:
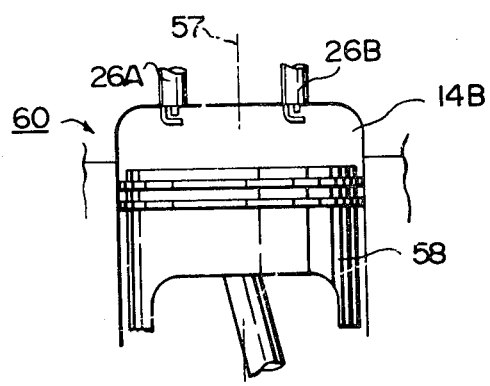
FIGS. 11-13 are schematic and sectional views of a pancake type combustion chamber, a bath-tube type combustion chamber and a Heron type combustion chamber, respectively, for the explanation of two-point ignition in these combustion chambers.
Figure 12:
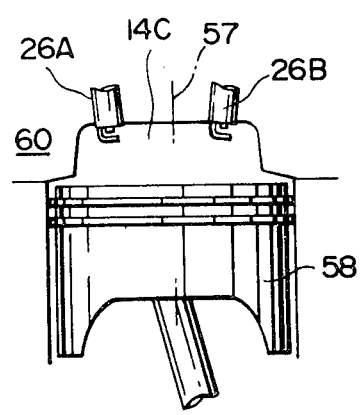
Figure 13:
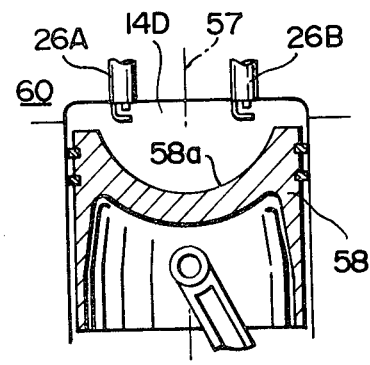

As mentioned hereinbefore, there is a certain restriction on the shape of the combustion chamber 14 in order to realize a smooth and efficient propagation of plural flame fronts. For example, neither a L-head (Ricardo head) type combustion chamber 114 shown in FIG. 9 nor a wedge type combustion chamber 214 shown in FIG. 10 is suitable to the engine system according to the invention (neither of these combustion chambers 114 and 214 is symmetrical with respect to the bore axis 57). As examples of suitably simple and symmetrical shapes of the combustion chamber 14 other than the hemispherical shape, FIGS. 11, 12 and 13 respectively show a pancake type combustion chamber 14B, a bath-tub type combustion chamber 14C and a Heron type combustion chamber 14D. Every one of these combustion chambers 14B, 14C and 14D is symmetrical with respect to the bore axis 57 and included in an imaginary and axial extension of the cylinder bore. No obstruction is offered to the flame propagation in these three types of combustion chambers 14B, 14C, 14D (and in the hemispherical combustion chamber 14), and flames spread over a relatively large volume per unit time in every one of these combustion chambers 14A, 14B, 14C and 14D.

The hemispherical combustion chamber 14 is quite favorable to the provision of two or three spark plugs 26A, 26B, 26C since the wall of this combustion chamber 14 offers least obstruction to a smooth propagation of spherical flame fronts from the respective ignition points, and the combustion is completed in a very large volume per unit time.

The pancake type combustion chamber 14B is as good as the hemispherical combustion chamber 14 in the smoothness of the flame propagation but is slightly inferior in the volumetric combustion rate immediately after the ignition. However, the pancake type combustion chamber 14B is industrially advantageous in the ease both in shaping the bottom face 60a of the cylinder head 60 and in designing the arrangement of the plural spark plugs and the intake and exhaust valves (these valves are omitted from FIGS. 11–13).

The bath-tub type combustion chamber 14C is generally comparable to the pancake type from the viewpoint of the smoothness and volumetric rate of the flame propagation. This type of combustion chamber 14C has the advantage that squishing occurs at the end of a compression stroke (the combustible gas mixture is violently squeezed from a peripheral region of the cylinder bore into a middle region of the recess in the cylinder head), with the effect of preventing the establishment of a quenching area and hence reducing the emission of unburned hydrocarbons. This combustion chamber 14C can easily be designed so as to make the magnitude of squishing optimum.

The Heron type combustion chamber 14D is comparable with the hemispherical combustion chamber 14 in the smoothness and average volumetric rate of the flame propagation but is similar to the pancake type combustion chamber 14B in the efficiency of the flame propagation immediately after the ignition. In addition, squishing is realized in this combustion chamber 14D substantially in the same manner as in the bath-tub type combustion chamber 14C.

Some consideration must be given also to the size of each combustion chamber to practise the multipoint ignition method. It will be understood that the combustion cannot be completed in a desirably short period of time even though two or three spark gaps are present in each combustion chamber. On the other hand, the provision of a plurality of spark plugs for an excessively small combustion chamber is not only difficult but also practically ineffective. In the present invention, it is preferable that the volume of each combustion chamber 14, 14B, 14C or 14D at the top dead center of the piston 58 ranges from 25 to 85 ml, while the displacement of each engine cylinder 56 is about 290–600 ml and the compression ratio is about 8–10.5. As seen from these values, an engine system according to the invention is particularly useful as an automotive engine.

We have carried out a comparative experiment for the hemispherical combustion chamber 14 and the L-head type combustion chamber 114 to examine the dependency of the NOx concentration in the exhaust gas and the required ignition timing. The result is presented in FIG. 14, wherein the curves H and H' represent the hemispherical combustion chamber 14 and the curves L and L' the L-head type combustion chamber 114, and the subscript FIGS. 1, 2 and 3 indicate the number of the spark plugs. The broken line curves $M_H$ and $M_L$ represent realizable minimum level of NOx emission for the hemispherical and L-head combustion chambers, respectively, disregarding the stableness of the combustion. The curve S is the stability-instability border: the combustion becomes unstable in a region above this curve S. In the case of two spark plugs, substantially the same spark gap arrangement was employed for the two types of combustion chambers 14 and 114.

For either type of combustion chamber 14, 114, the two-point ignition brings about a noticeable expansion of the stable combustion region with respect to the exhaust recirculation rate as seen by comparison of the curves $H_1$, $H_1'$, $L_1$ and $L_1'$ respectively with the curves $H_2$, $H_2'$, $L_2$ and $L_2'$. The exhaust recirculation rate can be raised and the emission of NOx can practically be reduced by the two-point ignition by comparison with the limited levels in the single-point ignition method. For the L-head type combustion chamber 114, however, it is practically impossible to raise the exhaust recirculation rate beyond about 20% even when the two-point ignition is employed since the combustion or engine operation becomes significantly unstable. When the two-point ignition is employed for the hemispherical combustion chamber 14, the exhaust recirculation rate can be raised up to about 40% without losing stability in the combustion or engine operation. The exhaust recirculation rate can further be raised up to about 60% maintaining the stability by the three-point ignition for this type of combustion chamber 14. These high exhaust recirculation rates lead to remarkable suppression of the formation of NOx.

Figure 14:
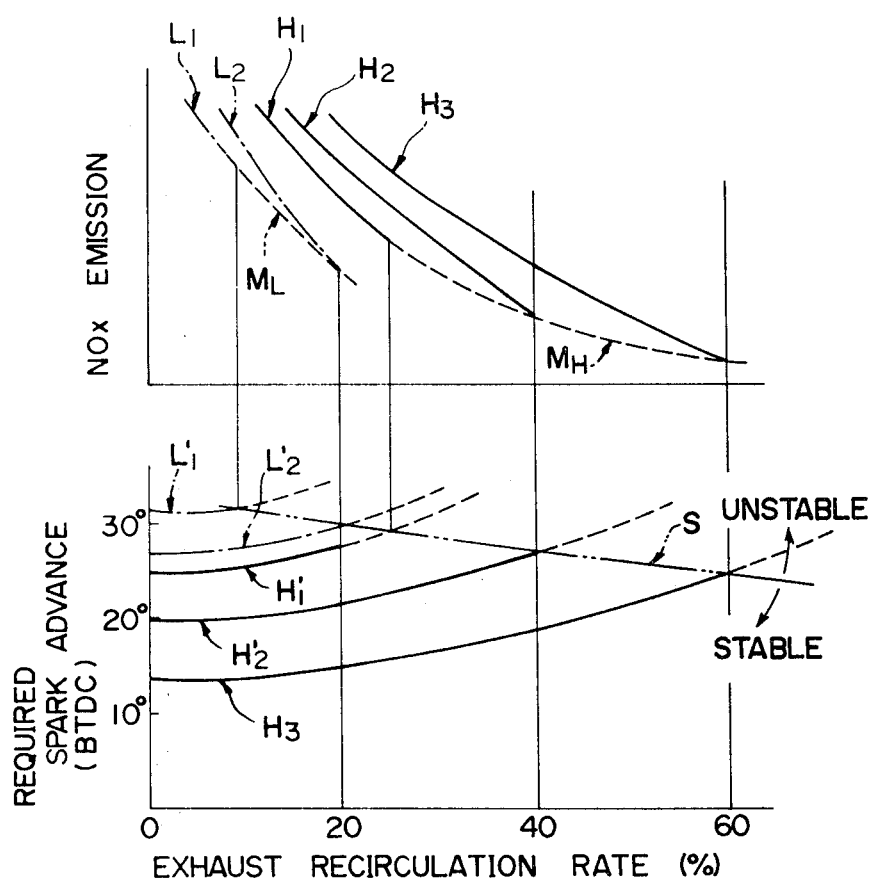
FIG. 14 is a graph showing the dependency of NOx emission and an optimum ignition timing on the exhaust recirculation rate for hemispherical and L-head type combustion chambers with various numbers of spark plugs.

The required ignition timing or spark advance, expressed by degrees before the top dead center, increase in general as the rate of combustion lowers in order to assure that the combustion is completed in about 80% or more of the entire volume of each combustion chamber when about 15% of a power stroke is done. However, an increase in the spark advance accompanies an increase in the negative work due to the combustion of an increased amount of air-fuel mixture during each compression stroke. A great increase in the spark advance, therefore, is unfavorable to the output characteristic of the engine. As seen in FIG. 14, generally a smaller spark advance is needed to the hemispherical combustion chamber 14 than to the L-head type combustion chamber 114, and the spark advance can be decreased as the number of the spark gaps in each combustion chamber increases. These experimental results prove a substantial contribution of the multi-point ignition to the shortening of the combustion time and the superiority of the hemispherical combustion chamber 14 with regard to the fuel economy and output characteristic of the engine.

The air-fuel ratio realized in the combustion chambers is another matter for consideration in practising the invention. It seems possible to repress the maximum combustion temperature and suppress the formation of NOx by operating the engine 10 with a very lean air-fuel mixture (having an air-fuel ratio far above a stoichiometric air-fuel ratio) instead of recirculating the exhaust gas, expecting that the excess air serves as a coolant or diluent (two or more spark plugs may be used in this case too according to the extent of the leanness). In reality, this method does not gain success because oxygen in the excess air reacts with nitrogen to form NOx at high temperatures during combustion. The formation of NOx is particularly augmented when the amount of the excess air is made as large as the amount of the recirculated exhaust gas in the engine system according to the invention. Besides, the recirculated exhaust gas has a larger heat capacity (specific heat) than air. Accordingly the exhaust gas serves as a more efficient diluent than air for repressing the maximum combustion temperature: the recirculation of the exhaust gas is apparently advantageous over the use of a very lean mixture in the attempt of suppressing the formation of NOx. The emission of NOx can be reduced below a definite level by recirculating the exhaust gas in a quantity smaller than the quantity of excess air needed to maintain the same level by the use of a lean air-fuel mixture, so that the engine exhibits better fuel economy and output characteristic when suppression of the NOx emission is achieved by the exhaust recirculation.

In the present invention, the air-fuel ratio is maintained at or around a stoichiometric air-fuel ratio. For air-gasoline mixture, the stoichiometric air-fuel ratio is about 14.7, so that the air-fuel ratio is set at 13–16.5. As mentioned hereinbefore, the values of the air-fuel ratio in the description refer to the air-fuel ratio realized in the combustion chambers of the engine at the moment of ignition. If the recirculated exhaust gas contains a substantial amount of air resulting from, for example, the introduction of secondary air to the thermal reactor 30, the carburetor 12 is adjusted to prepare an air-fuel mixture having a lower air-fuel ratio than the intended air-fuel ratio. It will be understood that the carburetor 12 is shown as an example of conventional air-fuel proportioning devices and that the air-fuel ratio adjustment for the carburetor 12 is similarly applied to an electronically controlled fuel injection system (not shown) when such system is employed in place of the carburetor 12. As is well known, the air-fuel ratio is intentionally varied according to the operational condition of the engine. The air-fuel ratio in the present invention is not fixed to a value within the above specified range 13–16.5 but is maintained within this range as an average. The air-fuel ratio remains of course in this range in a medium speed range of the engine 10.

Figure 15:
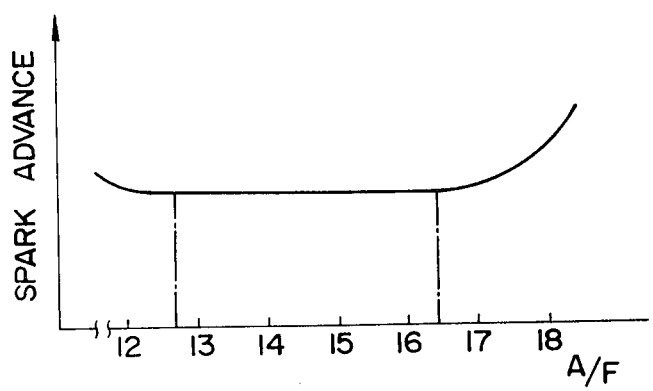
FIG. 15 is a graph showing the relationship between the air-fuel ratio and an optimum ignition timing in an engine system according to the invention.

FIG. 15 shows the relationship between the air-fuel ratio and the required ignition timing (degrees, BTDC) experimentally confirmed for an engine having hemispherical combustion chambers, each provided with two spark plugs, at a constant exhaust recirculation rate of 30%. As seen, the spark advance can be made minimal, meaning that the engine operates stably and efficiently, when the air-fuel ratio is in the above specified range.

Figure 16:
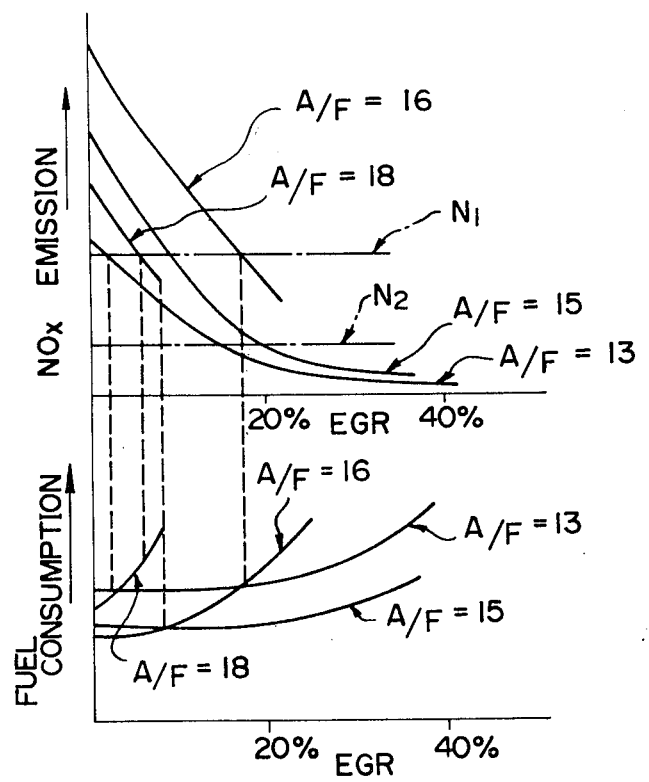
FIG. 16 is a graph showing variations in NOx emission and fuel economy as the function of the exhaust recirculation rate with the employment of various air-fuel ratios.

The influence of the air-fuel ratio on the level of NOx emission and the fuel economy of the engine was examined on the same engine (hemispherical combustion chambers with two spark plugs) at various exhaust recirculation rates. The result is presented in FIG. 16. The level of NOx emission always lowered as the exhaust recirculation rate was raised within the range of 0–40% while the experiment was repeated at four different air-fuel ratios, 13, 15, 16 and 18. However, a stable operation region with respect to the exhaust recirculation rate narrowed as the air-fuel ratio is raised. When the air-fuel ratio was 18, the exhaust recirculation rate could not be made more than 7–8% because of a significant instabilitiy of the engine operation. The exhaust recirculation could greatly be raised without causing instability of the engine operation by setting the air-fuel ratio at 13 or 15. With particular regard to the level of NOx emission, the setting of the air-fuel ratio at 13 was most effective. However, it is more advantageous to set the air-fuel ratio at 15, which is closest to the stoichiometric ratio, with consideration of the relationship between the air-fuel ratio and the fuel economy too.

If it suffices to suppress the emission of NOx to a level $N_1$ which is not extremely low, the aim is achieved with best fuel economy by setting the air-fuel ratio at 15. The fuel economy becomes worse in turn as the air-fuel ratio is varied to 13, 16 and 18. When a far lower NOx emission level $N_2$ is required, the requirement cannot be met by setting the air-fuel ratio at 16 or 18 due to the narrowness of the stable operation region. The requirement can be met whether the air-fuel is 13 or 15, but a better fuel economy can be achieved when the air-fuel ratio is 15.

Thus it was fully confirmed that, in an engine system according to the invention, the maintenance of the air-fuel ratio in the range of 13–16.5, particularly in a middle portion of this range, is most suitable for greatly suppressing the formation of NOx and at the same time operating the engine with a good fuel economy.

As an aid for rapidly completing the combustion, it is preferable that the combustion chamber which is provided with two or three spark plugs is designed so as to realize swirling and/or squishing of the diluted combustible mixture. As is well known, these phenomena are effective in thoroughly homogenizing the mixture and promoting the atomization of the fuel. The squishing occurs almost always in the bath-tube type combustion chamber 14C and the Heron type combustion chamber 14D as described hereinbefore. It is easy to realize the squishing in the hemispherical combustion chamber 14 and the pancake type combustion chamber 14B by a slight modification of these combustion chambers 14, 14B in a peripheral region. However, care must be taken so as not to establish an excessively intense squishing in the engine system according to the invention, because an excessively intense squishing causes an increase in the maximum combustion temperature too.

Figure 17:
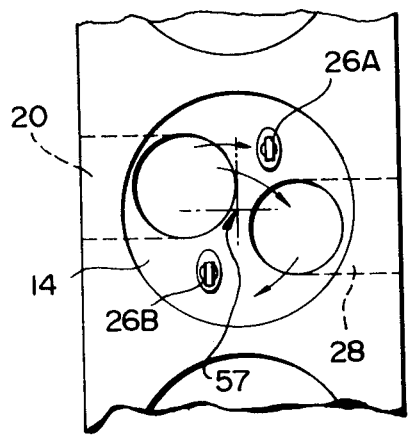
FIGS. 17 and 18 are schematic and cross-sectional views of a combustion chamber, respectively showing two different arrangement of the intake port for causing a swirl of an air-fuel mixture in the combustion chamber.

Swirling of the diluted combustible mixture can be realized by various methods. A few examples are given in FIGS. 17–19. In FIG. 17, both the intake port 20 and the exhaust port 28 for each combustion chamber 14 are not directed to the center of the combustion chamber 14 in plan view. In the same view, the axis of the intake port 20 extends generally normal to and on one side of a diameter of the combustion chamber 14 while the axis of the exhaust port 28 extends generally normal to but on the other side of the same diameter. The respective axes of the intake and exhaust ports 20, 28 do not meet or intersect but pass each other. As the result, the air-fuel mixture diluted with the recirculated exhaust gas is forced to swirl upon inflow into the combustion chamber 14.

Figure 18:
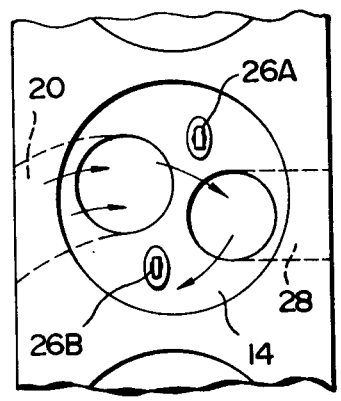

In FIG. 18, the intake port 20 extends or twists as part of a circumference in plan view of the combustion chamber 14, so that the diluted air-fuel mixture swirls upon inflow into the combustion chamber 14.

Figure 19:
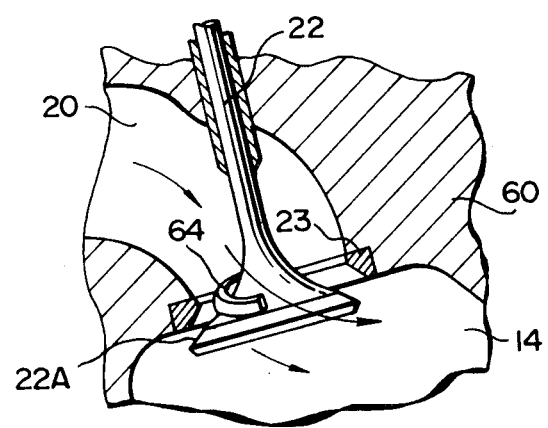
FIG. 19 is a sectional view of an intake port and an intake valve, showing a still different measure for causing a swirl.

In FIG. 19, a swirl-plate 64 which takes the form of an arc-shaped strip is attached onto a conical surface 22a of the head of the intake valve 22, so as to circumferentially guide the diluted air-fuel mixture. Alternatively, a generally, similar swirl-plate (not shown) may be attached to the valve seat 23 for the intake valve 22.

These swirl-causing measures are highly effective in thoroughly mixing the air-fuel mixture with the recirculated exhaust gas particularly when the exhaust recirculation is done at high rates.

The thermal reactor 30 is included in the exhaust system for the purpose of oxidizing the unburned hydrocarbons and carbon monoxide contained in the exhaust gas before emission into the atmosphere. For efficient function of the thermal reactor 30, it is desired that the exhaust gas be introduced into the reactor 30 at high temperatures. Each exhaust port 28 for each engine cylinder, therefore, is preferably formed close to another exhaust port 28 for an adjacent and nearest engine cylinder such that these two exhaust ports 28 join to form one passage (indicated at 29 in FIG. 1) within the cylinder head 60 at a short distance from the exhaust valves 24. Such a configuration of the exhaust ports 28 is commonly called "siamese ports" and has the advantage of a lessened drop in the exhaust gas temperature because of a decrease in the total surface area of the exhaust ports 28 (accordingly a decrease in the heat transfer to the cylinder head 60). In addition, the wall of the exhaust ports 28, 29 is preferably covered with a heat-insulating liner.

The thermal reactor 30 is provided with a secondary air supply circuit (indicated at 31 in FIG. 1) to accomplish the intended oxidation reactions, because the exhaust gas resulting from combustion of an air-fuel mixture close to the stoichiometric mixture contains little oxygen. As is usual, the secondary air is introduced into the circuit 66 by either an air pump (not shown) or a suction device (not shown) which is operated by a pulsative vacuum created by pulsation of the exhaust gas pressure in the exhaust system. The thermal reactor 30 in FIG. 1 may be replaced by a usual exhaust manifold accompanied with the provision of a catalytic converter (not shown) at a location downstream from the exhaust manifold.

What is claimed is:

1. An engine system comprising:
   an internal combustion engine of the reciprocating piston type having an intake valve and an exhaust valve for each combustion chamber thereof;
   an air-fuel proportioning means for supplying a combustible mixture of air and a hydrocarbon fuel to said engine;
   an exhaust recirculation means for recirculating a portion of the exhaust gas from the exhaust line of said engine to each combustion chamber together with said combustible mixture at a controlled volumetric flow rate relative to the volume of air admitted into each combustion chamber;
   a thermal reactor provided in said exhaust line to oxidize carbon monoxide and unburned hydorcarbons contained in the exhaust gas from said engine;
   means for supplying secondary air to said oxidation means; and
   at least two spark plugs which produce sparks substantially simultaneously for each combustion chamber;
   said intake and exhaust valves being constructed and arranged such that a substantial overlap of the opening periods of said exhaust valve and said intake valve takes place, so that a substantial portion of the combustion gas is left unexhausted from each combustion chamber;
   said combustion chamber being defined between the top face of the piston and the bottom face of a cylinder head by a surface of revolution on the longitudinal axis of the cylinder bore;
   the number of said at least two spark plugs being determined on the basis of a total volume of the recirculated exhaust gas and the unexhausted combustion gas relative to the volume of air supplied to each combustion chamber, said number being two when said total volume is about 50% of the volume of said air at the maximum and three when said total volume is about 60% at the maximum;
   the spark gaps of said at least two spark plugs being arranged distant from each other in each combustion chamber such that, when the entire area of each combustion chamber in plain view is divided into a plurality of sectors which are in the same number as said at least two spark plugs and of approximately the same area, each of said sectors contains one of said spark gaps.

2. An engine system as claimed in claim 1, wherein said bottom face of said cylinder head is recessed such that said combustion chamber is generally of the hemispherical type.

3. An engine system as claimed in claim 1, wherein said bottom face of said cylinder head is recessed such that said combustion chamber is generally of the pancake type.

4. An engine system as claimed in claim 1, wherein said bottom face of said cylinder head is recessed such that said combustion chamber is generally of the bathtub type.

5. An engine system as claimed in claim 1, wherein said top face of said piston is recessed such that said combustion chamber is generally of the Heron type.

6. An engine system as claimed in claim 1, wherein each of said spark gaps is positioned in a middle region of each of said sectors.

7. An engine system as claimed in claim 6, wherein said spark gaps are all positioned, in plan view of each combustion chamber, in an annular area defined between two concentric circumferences with said axis as the center thereof, the diameters of said circumferences being 40% and 60% of the diameter of the cylinder bore, respectively.

8. An engine system as claimed in claim 7, wherein each combustion chamber has a volume in the range from 25 to 85 ml at the top dead center of the piston.

9. An engine system as claimed in claim 1, wherein said overlap of the opening periods of said exhaust valve and said intake valve is in the range from about 20 to about 60 degrees in terms of the crank angle.

10. An engine system as claimed in claim 9, wherein the effective diameter of the valve head of said intake valve is in the range from 42 to 52% of the diameter of the cylinder bore, and the effective diameter of the valve head of said exhaust valve is in the range from 40 to 50% of the diameter of the cylinder bore.

11. An engine system as claimed in claim 1, wherein said air-fuel proportioning means is adjusted such that the air-fuel ratio realized in each combustion chamber is in the range from 13 to 16.5 on the average when said hydrocarbon fuel is gasoline.

12. An engine system as claimed in claim 1, wherein an intake port for each combustion chamber is so arranged as to produce a swirl of said combustible mixture and the exhaust gas recirculated into each combustion chamber.

* * * * *

UNITED STATES PATENT OFFICE
CERTIFICATE OF CORRECTION

Patent No. 4,133,330         Dated January 9, 1979

Inventor(s) YASUO NAKAJIMA, YOSHIMASA HAYASHI, TOORU YOSHIMURA

It is certified that error appears in the above-identified patent and that said Letters Patent are hereby corrected as shown below:

Column 13, line 22, change "a thermal reactor" to --oxidation means--;

Signed and Sealed this

Fifth Day of February 1980

[SEAL]

Attest:

SIDNEY A. DIAMOND

Attesting Officer      Commissioner of Patents and Trademarks